(12) United States Patent
Liguori

(10) Patent No.: US 9,462,285 B2
(45) Date of Patent: Oct. 4, 2016

(54) VIDEO TRANSMISSION SYSTEM HAVING REDUCED MEMORY REQUIREMENTS

(75) Inventor: Vincenzo Liguori, Dee Why (AU)

(73) Assignee: Memxeon Pty Ltd, Manly NSW (AU)

( * ) Notice: Subject to any disclaimer, the term of this patent is extended or adjusted under 35 U.S.C. 154(b) by 1088 days.

(21) Appl. No.: 13/368,021

(22) Filed: Feb. 7, 2012

(65) Prior Publication Data
US 2012/0134421 A1  May 31, 2012

Related U.S. Application Data

(63) Continuation of application No. PCT/AU2011/000333, filed on Mar. 25, 2011.

(30) Foreign Application Priority Data

Apr. 7, 2010 (AU) ............................ 2010901452

(51) Int. Cl.
*H04N 19/00* (2014.01)
*H04N 19/426* (2014.01)

(52) U.S. Cl.
CPC .................................. *H04N 19/428* (2014.11)

(58) Field of Classification Search
CPC ................................................. H04N 19/428
USPC ................................................ 375/240.24
See application file for complete search history.

(56) References Cited

U.S. PATENT DOCUMENTS

| 5,923,376 | A | * | 7/1999 | Pullen et al. | ............ | 375/240.16 |
| 6,130,911 | A | * | 10/2000 | Lei | ............ | 375/240.16 |
| 2003/0167472 | A1* | | 9/2003 | Barbanson et al. | .......... | 725/131 |
| 2006/0171685 | A1 | | 8/2006 | Chen | | |
| 2011/0090968 | A1* | | 4/2011 | Ye | ......... | H04N 19/61 |
| | | | | | | 375/240.24 |

FOREIGN PATENT DOCUMENTS

| EP | 1202579 A1 | 5/2002 |
| WO | 2007124188 A2 | 11/2007 |
| WO | 2009098315 A1 | 8/2009 |

OTHER PUBLICATIONS

EPO Search Report, European Patent Application No. 11764939.2, Apr. 10, 2014.
Budagavi, Video Coding Using Compressed Reference Frames, ICASSP 2008, Mar. 31, 2008, Piscataway, NJ, US.
Cheng, Multimode Embedded Compression Codec Engine for Power-Aware Video Coding System, IEEE Transactions on Circuits and Systems for Video Technology, vol. 19, No. 2, Feb. 2009, Piscataway, NJ, US.
International Search Report, PCT/AU2011/000333 dated Sep. 27, 2011.

* cited by examiner

*Primary Examiner* — Jeffery Williams
(74) *Attorney, Agent, or Firm* — Calvin B. Ward

(57) ABSTRACT

An encoder and method for using the same to encode a video stream is disclosed. The encoder includes an input port that receives a video stream that includes a plurality of frames. A first compression sub-system generates a plurality of compressed reference frames using a lossy compression method. The compressed reference frames are communicated to a remote device. A reference frame storage sub-system stores one of the compressed reference frames in a compressed format for use in compressing a subsequent frame in the video stream using a lossy compression method. A second compression sub-system encodes a second plurality of frames using the compressed reference frame stored in the reference frame storage sub-system as a reference, the second compression sub-system generating a compressed video frame. Each compressed video frame that is not a reference frame is coded directly from one of the reference frames.

15 Claims, 5 Drawing Sheets

VIDEO TRANSMISSION SYSTEM HAVING REDUCED MEMORY REQUIREMENTS

CROSS-REFERENCE TO RELATED PATENT APPLICATIONS

This application is a continuation under 35 U.S.C. §111 of PCT/AU/000333 filed on Mar. 25, 2011, said PCT application claiming priority from Australian Patent Application 2010901452 filed on Apr. 7, 2010, said patent applications being incorporated by reference herein.

BACKGROUND OF THE INVENTION

This application claims priority from Australian Provisional Application 2010901452 filed 7 Apr. 2010, which is hereby incorporated by reference.

Schemes for the transmission and storage of video material typically utilize compression schemes to reduce the storage and bandwidth requirements associated with the video material. One class of compression schemes makes use of the redundancy between successive frames of a video sequence. In these schemes, successive frames are represented in terms of a transformation of a reference frame. For example, in block motion prediction schemes, each frame is divided into a plurality of fixed size blocks. A frame to be transmitted is first coded in terms of the blocks of a reference frame by finding the block in the reference frame which matches the corresponding block in the frame to be coded. The coded frame can then be initially approximated by a list of vectors that specify the movement of a block in the reference frame to the corresponding block of the frame to be coded. The difference between this approximation and the actual frame is then coded using an appropriate compression algorithm. Since the difference between the approximation frame and the actual frame contains much less information than the actual frame, a significant savings in the number of bits needed to represent the new frame is obtained.

The amount of memory needed to store the reference frame is a significant problem, particularly in high definition video transmissions for small handheld devices. Small handheld devices typically rely on system-on-chip designs that have insufficient memory to hold a reference frame of a high-definition transmission. As a result, a separate memory chip or chips are required. These additional chips increase the cost of the device, and in addition, use substantial additional power. The additional power is particularly problematic in battery-operated devices.

One possible solution to the memory problem would be to use a compression algorithm to store the reference frame in its memory. When pixels of the reference frame are needed by the compression engine, the compressed reference frame would be partially decompressed to provide the pixels to the compression engine. If a lossless compression scheme is used for storing the reference frame, the memory savings are insufficient to avoid the need for additional memory in a handheld device such as those discussed above.

If a lossy compression scheme is used for storing the reference frame, the reference frame used by the transmitter will be different than the reference frame used by the receiver. This leads to artifacts in the video sequence generated by the receiver. These artifacts are particularly troublesome in compression schemes in which each frame utilizes the previous frame as its "reference" frame. In such systems, the artifacts become more pronounced with each frame.

SUMMARY OF THE INVENTION

The present invention includes an encoder and method for using the same to encode a video stream. The encoder includes an input port that receives a video stream which includes a plurality of frames to be encoded. A first compression sub-system generates a plurality of compressed reference frames using a first lossy compression method. An output stage communicates the compressed reference frames to a device that is remote from the encoder. A reference frame storage sub-system stores one of the compressed reference frames in a compressed format for use in compressing a subsequent frame in the video stream, the compressed reference frame being compressed using a second lossy compression method. A second compression sub-system encodes a second plurality of frames using the compressed reference frame stored in the reference frame storage sub-system as a reference, the second compression sub-system generating a compressed video frame. Each compressed video frame that is not a reference frame is coded directly from one of the reference frames. The second plurality of the frames is also communicated to the remote device.

DETAILED DESCRIPTION OF THE PREFERRED EMBODIMENTS OF THE INVENTION

Figure 1:
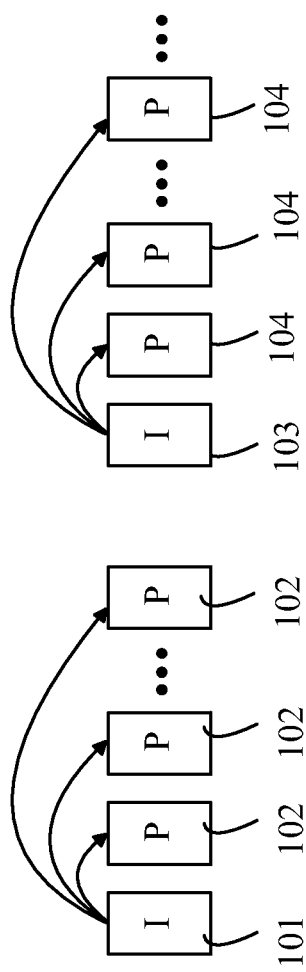
FIG. 1 illustrates a protocol in which multiple P-frames are generated directly from the same I-frame.

To simplify the following discussion, two types of video frames will be defined. The first type of video frame will be referred to as a reference frame or an I-frame. An I-frame does not depend on any previous or future frame. The second type of video frame will be referred to as a P-frame. A P-frame is coded with reference to another frame in the video sequence. The P-frame can be coded with respect to an I-frame or with respect to a previous P-frame. Refer now to FIG. 1, which illustrates a protocol in which multiple P-frames are generated directly from the same I-frame. In this mode of video transmission, an I-frame 101 is sent from the encoder to the decoder. Each successive frame 102 of the stream is then coded with respect to this I-frame. When the I-frame is no longer a good approximation for the sequence of frames, a new I-frame 103 is sent followed by a plurality of P-frames 104 coded with respect to that I-frame. This mode will be referred to as direct I-frame encoding in the following discussion.

Figure 2:
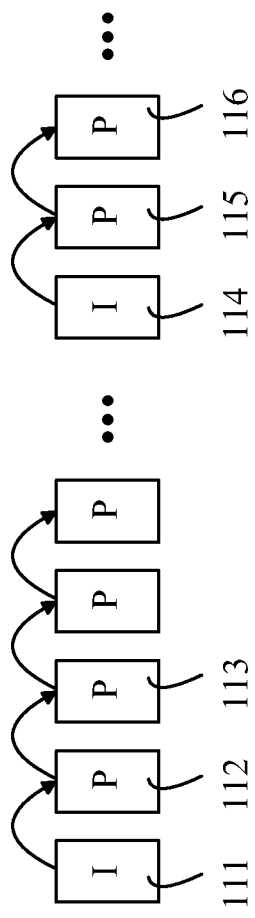
FIG. 2 illustrates a second mode of coding referred to as previous frame encoding.

Refer now to FIG. 2, which illustrates a second mode of coding referred to as previous frame encoding. In this mode, the encoder starts by sending an I-frame 111. Each following frame is then decoded with reference to the previous received frame. Frame 112 is encoded using the I-frame as a reference; frame 113 is encoded using frame 112 as a reference, and so on. When the scene changes such that the previous frame is no longer a good approximation to the next frame, a new I-frame is sent as shown at 114. The subsequent frames are again coded with respect to the previous frame. That is, frame 115 utilizes frame 114 as its reference; frame 116 uses frame 115 as its reference, and so on.

Figure 3:
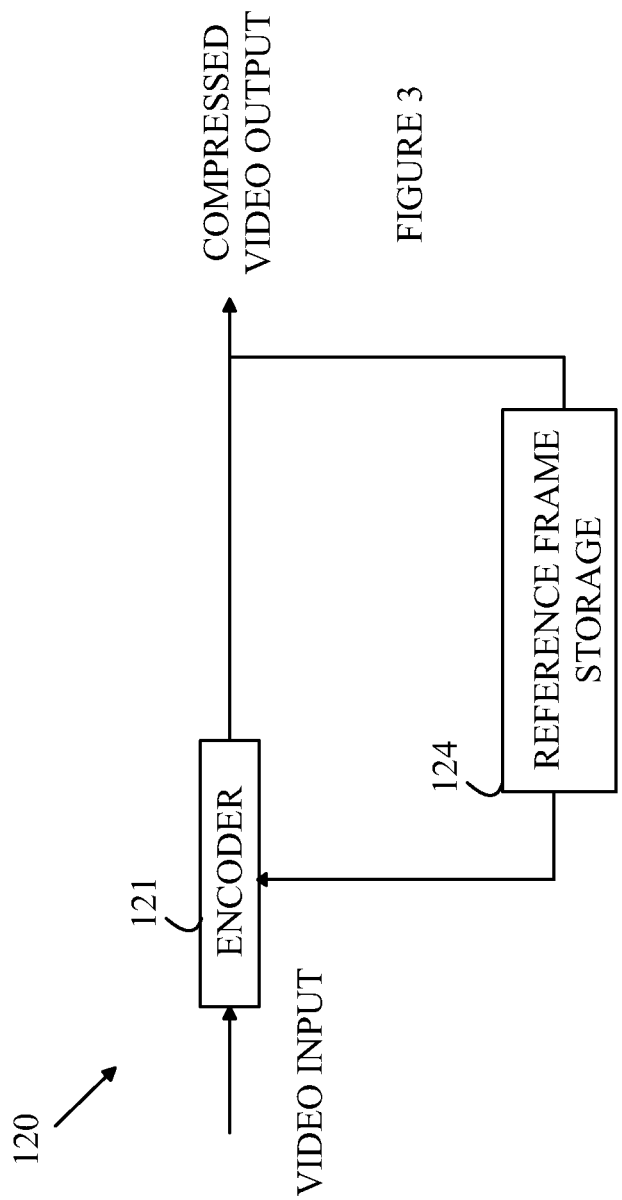
FIG. 3 is a simplified block diagram of one embodiment of an encoder system according to the present invention.

Refer now to FIG. 3, which is a simplified block diagram of one embodiment of an encoder system according to the present invention. Encoder 120 operates in the first mode described above. That is, each P-frame is generated directly from an I-Frame. Encoder system 120 receives an input video stream comprising a sequence of frames. Each frame is encoded by encoder 121 using a lossy compression algorithm to generate a compressed video output that is transmitted to a remote decoder. If the frame currently being encoded is an I-frame, encoder 121 compresses the frame without reference to a reference frame. If the frame currently being encoded is a P-frame, encoder 121 accesses the reference frame, which is stored in a memory that is part of a reference frame storage component 124. If the current frame is to become a reference frame for one or more subsequent frames, the encoded video from encoder 121 is stored in reference frame storage component 124.

As noted above, the large memory required to store the reference frame(s) presents problems, particularly for small handheld devices that are battery powered. Hence, reference frame storage component 124 stores the reference frames in a compressed format. To provide the needed level of compression, a lossy compression system must be utilized. If the losses result in a reference frame in the encoder system that differs from the reference frame used by the remote decoder, video artifacts will be generated at the remote decoder. These artifacts are particularly problematic in the second transmission mode discussed above in which each P-frame used the previous P-frame as its reference, since the difference between the reference frames used by the encoding system and the remote decoder increases with each successive P-frame.

In one aspect of the present invention, the lossy compression algorithm used to store the reference frames is the same algorithm used by encoder 121 to compress the image. Since the remote decoder also utilizes this algorithm to regenerate the reference frame, no additional degradation is generated by compressing the reference frame at the encoding subsystem. Reference frame storage component 124 stores the entire compressed reference frame including any additional information needed to decode the reference frame.

Figure 4:
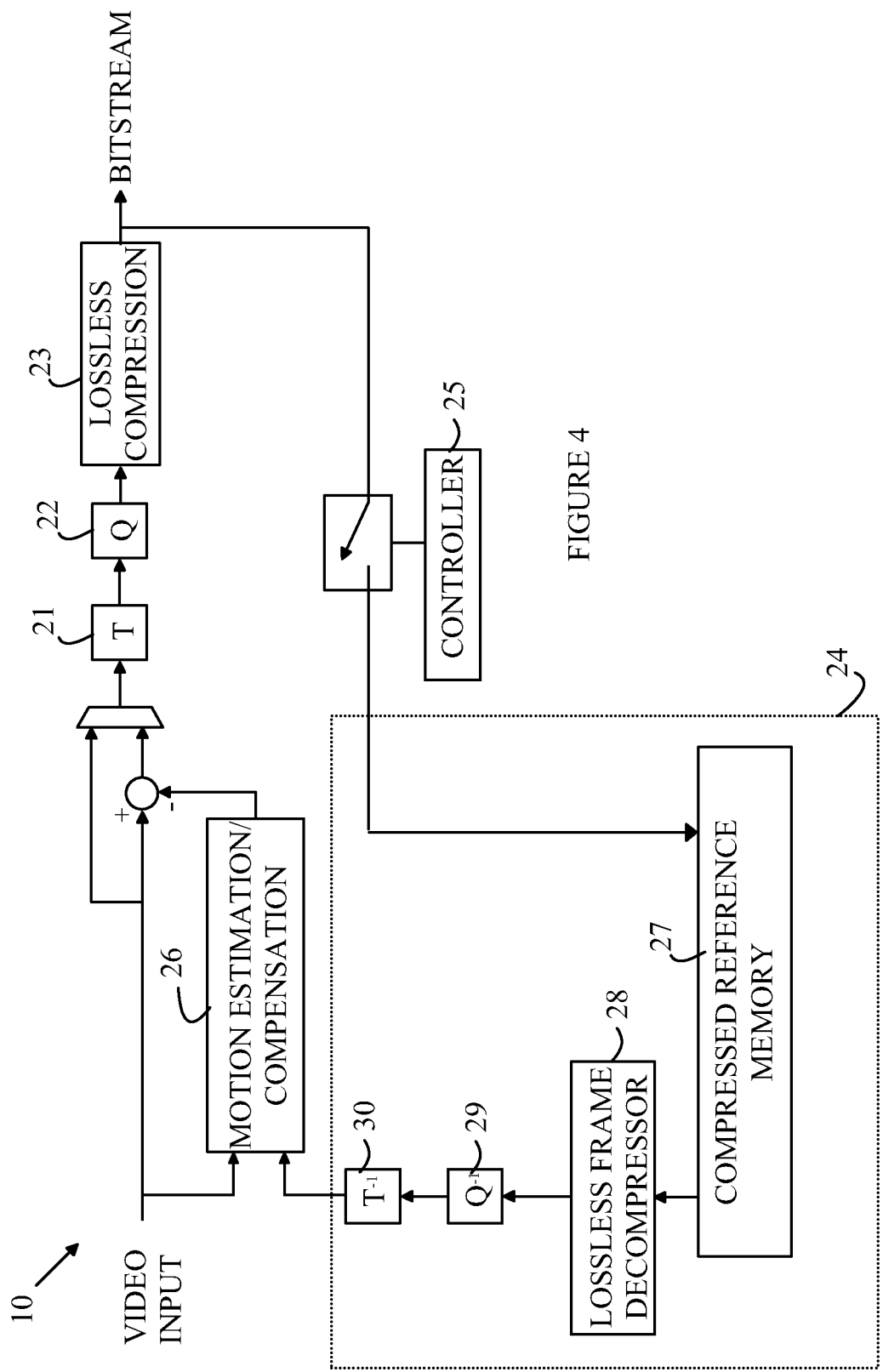
FIG. 4 is a more detailed schematic drawing of an encoder according to one embodiment of the present invention.

Refer now to FIG. 4, which is a more detailed schematic drawing of an encoder 10 according to one embodiment of the present invention that operates in the first mode discussed above in which each P-frame is compressed with respect to an I-frame, rather than the preceding P-frame. Both the I-frames and P-frames are compressed using a transform that depends on the particular compression protocol being implemented. The compression algorithm can be more easily understood with respect to the I-frames. In one exemplary method, the I-frame is divided into a plurality of blocks of pixels. Each block is transformed using a two-dimensional transform such as the discrete cosine transform (DCT) or a wavelet transform as shown at 21. The transform coefficients are then quantized as shown at 22. That is, each coefficient is replaced by one of a plurality of values that approximates the coefficient value in question. The number of possible quantized values available for each coefficient depends on the degree of compression that is to be obtained. This process is inherently "lossy" in that the original coefficient values can no longer be retrieved, and hence, the original frame cannot be recovered with perfect accuracy from the quantized coefficients. For example, if the transform coefficients values vary from 0 to 10 and only 10 levels are to be used, each transform value could be rounded to the nearest integer value. Hence, a transform value of 6.3 would be replaced by the value 6.

The collection of coefficients and other information is then typically further compressed using a lossless compression system 23 that takes into account redundancies in the compressed image and the frequency with which each value occurs in the compressed image. This process is completely reversible, and hence, does not lead to further degradation of the image. The lossless compression typically provides a compression factor of two. The lossy compression can provide a compression factor in the order of 12:1 for an I-frame. When controller 25 generates a new I-frame, controller 25 causes a copy of that compressed I-frame to be stored in memory 27 of reference frame storage component 24.

A P-frame is compressed using a two-step processing algorithm in which the I-frame on which the P-frame depends is used to generate an approximation frame utilizing motion compensation system 26. This approximation image is then subtracted from the input frame to provide a difference image. The approximation frame is typically constructed using a motion estimation and compensation algorithm; however, any algorithm that reduces the temporal redundancy between the frames of the video stream could be utilized. The resultant difference image is then transformed and quantized as discussed above.

During the generation of the approximation frame, the I-frame is stored in a reference frame storage component 24. When pixels of the stored I-frame are needed by motion compensation system 26, the relevant block in the compressed image is decompressed using a decompression stage 28 which recovers the quantized coefficients of the block in question. The quantization is then reversed using inverse quantizer 29. Finally the pixels of the block are generated using inverse transform 30.

The present invention is based on the observation that the same lossy compression algorithm used to compress the I-frame prior to transmission can be used to reduce the storage needed by the encoder, and the resultant reconstructed reference frame will be an exact match for that used by the decoder. When the reference frame values are needed during the subsequent P-frame processing, a portion of the compressed reference frame stored in memory 27 is decompressed and provided to motion estimation system 26. The decompression utilizes decompressor 28, inverse quantizer 29, and inverse transform 30.

Figure 5:
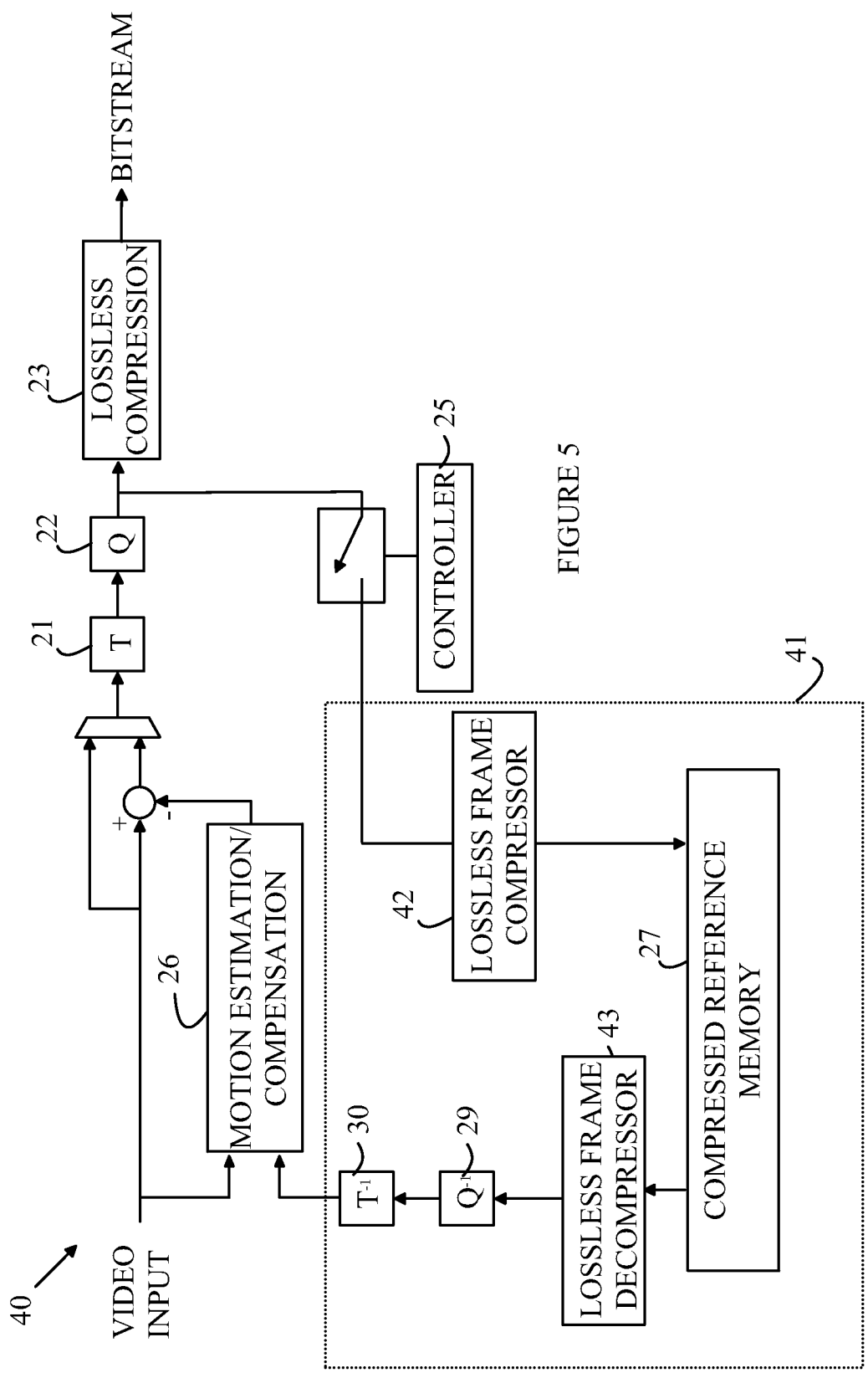
FIG. 5 is a schematic drawing of another embodiment of an encoder according to the present invention.

The embodiments shown in FIG. 4 utilize the same lossless compression algorithm utilized in the transmission of the I-frame to the decoder for storing the I-frame in memory 27. However, other lossless compression algorithms could be utilized or the lossless compression could be eliminated. Refer now to FIG. 5, which is a schematic drawing of another embodiment of an encoder according to the present invention. In encoder 40, controller 25 copies an I-frame to memory system 41 after the I-frame has been compressed via transform 21 and quantizer 22. A separate lossless compressor 42 is utilized by memory system 41 prior to storing the I-frame in memory 27. A corresponding decompressor 43 is used to reverse the lossless compression prior to decoding portions of the I-frame for use by motion estimation system 26.

The optimum choice for the lossless compression algorithm for the lossless compressor and decompressor depends on the particular video compression algorithm that is being used. The complexity of using a separate lossless compressor and decompressor from those already provided by the video compression algorithms is a balance between reducing the complexity of the encoder and the need to be able to access individual pixels of the stored reference frame without decompressing more of the stored reference frame than necessary.

It should be noted that lossless compressor 42 and the corresponding decompressor 43 are optional. As noted above, the amount of compression provided by lossless compression is typically of the order of a factor of 2. Hence, the corresponding memory savings are small compared to the savings obtained with the lossy compression. If the lossy compression provides sufficient compression to enable on-chip storage of the I-frames, the lossless compression and decompression can be eliminated.

The manner in which the motion compensation system generates the approximation image with reference to the I-frame will now be discussed in more detail. In one aspect of the present invention, the motion compensation system divides the incoming frame into a plurality of blocks. For each block, the motion compensation system attempts to find the block of the same size in the reference frame that most nearly matches that block using some appropriate measure of similarity of the blocks such as a correlation function or the sum of the absolute values of the differences of the corresponding pixels in the blocks. The search is carried out in a region of the reference frame that is centered at the position corresponding to the position in the incoming frame of the block that is being processed.

Figure 6:
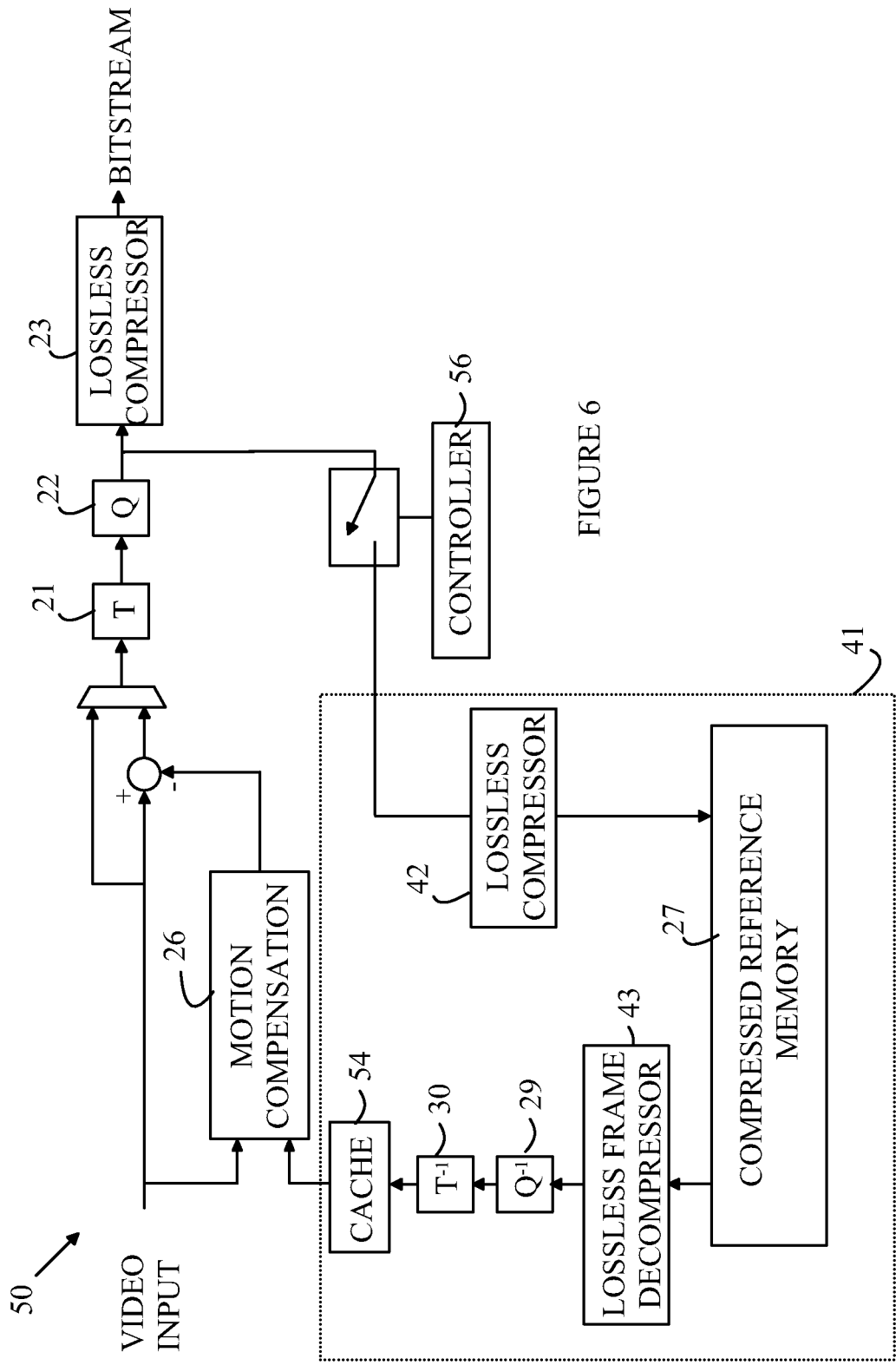
FIG. 6 is a schematic drawing of another embodiment of an encoder according to the present invention.

Refer now to FIG. 6, which is a schematic drawing of another embodiment of an encoder according to the present invention. Encoder 50 includes a cache memory 54 into which the pixel values from a block in the compressed reference frame is decompressed. For the purposes of this discussion, it will be assumed that the lossless compression algorithm allows a single block to be decompressed. The inverse quantization step regenerates the amplitude of the coefficients of the transformed block. The inverse transformation then yields a block of pixels, which are then stored in cache 54. In one aspect of the present invention, the motion compensation system 26 processes the blocks of the incoming video frame in a predetermined order. Accordingly, the area in the reference frame that must be explored is known well in advance of the processing of the corresponding block. As a result, controller 56 can pre-decompress the blocks so that the pixels will be ready when the motion compensation system requires the reference pixels. To simplify the drawings, the connections between controller 56 and the other components have been omitted.

Consider the case in which the search area in the reference frame is a 3×3 block area centered on the corresponding position in the incoming frame. In principle, nine blocks are needed to do the motion compensation. However, if the blocks are processed in a raster scan pattern, each new block on a line requires only three new blocks from the reference frame, since six of the blocks used in processing the prior block in the incoming frame will also be used for this block. Hence, if the search area is an N×N block area, a cache that stores N×N decoded blocks is advantageous. The minimum size for the cache is the size of one block. If the blocks are to be pre-fetched and compressed, an additional N blocks of cache space is desirable. However, even this amount of cache space is small compared to the memory that would be required if the entire reference frame were stored without compression.

In the above-described embodiments of the present invention, the reference frame is stored as a compressed frame that matches the compressed version of the reference frame sent to the decoder. This arrangement eliminates the artifacts that arise if the encoder and decoder are not using exactly the same reference frame. However, since the present invention generates each P-frame from an I-frame, a small discrepancy in the reference frames can be tolerated since the regenerated frames at the decoder will not accumulate errors from frame to frame.

The above-described embodiments of the present invention store the reference frame at the encoder utilizing the same lossy algorithm used by the decoder to decode the image. Hence, errors resulting from differences in the lossy encoding algorithm between the encoder and the receiver are eliminated. However, it should be noted that some degree of difference between the stored reference frames can be tolerated in transmission schemes in which each P-frame is constructed from an I-frame. Since the errors do not propagate from frame to frame, the effect of such differences is reduced compared to schemes in which the P-frames are computed from previously received P-frames. These additional errors must be weighed against the economic advantages associated with using a different reference frame compression algorithm at the encoder. For example, if a more lossy algorithm is utilized, the degree of compression of the reference frame can be increased, thereby decreasing the size of the memory that must be incorporated in the encoder and the power needed to operate that larger memory.

The above-described embodiments utilize a particular compression scheme for the I-frames in which the I-frame is divided into blocks and each block is then encoded without reference to other blocks. However, it is to be understood that the present invention can utilize any algorithm to compress the I-frames provided the compressed I-frames pixels can be recovered without decompressing the entire I-frame at once. For example, in some compression schemes, each block of the I-frame is first matched to a predicted block, extrapolated from previously encountered blocks in that I-frame. The difference between said predicted block and the current block is then computed and the difference block encoded. In the present invention, all the information needed to decode such a compressed I-frame is stored in the reference frame storage sub-system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An encoder comprising:
   an input port that receives a video stream comprising a plurality of video frames to be encoded;
   a first compression sub-system that generates a plurality of compressed reference frames using a first lossy compression algorithm, each compressed reference frame being generated from a corresponding one of said plurality of video frames without reference to any previously encoded video frames, said compressed reference frames being communicated to said remote device;

an output stage that communicates said compressed reference frames to a device that is remote from said encoder;
a reference frame storage sub-system that stores one of said compressed reference frames in a compressed format for use in compressing a subsequent video frame in said video stream, said compressed reference frame being compressed using a second lossy compression algorithm; and
a second compression sub-system that encodes a second plurality of said video frames using said compressed reference frame stored in said reference frame storage sub-system as a reference without updating said compressed reference frame, said second compression sub-system generating a compressed video frame from each of said second plurality of said video frames, said encoded second plurality of said video frames being communicated to said remote device,
wherein said second lossy compression algorithm is said first lossy compression algorithm.

2. The encoder of claim 1 wherein said first lossy compression algorithm includes a first lossless compression algorithm that compresses the output of said first lossy compression algorithm to generate said compressed reference frame that is communicated to said remote device.

3. The encoder of claim 2 wherein said stored compressed reference frame contains a copy of a compressed reference frame that was compressed using said first lossless algorithm.

4. The encoder of claim 2 wherein said stored compressed reference frame contains a copy of a compressed reference frame that was compressed using a second lossless algorithm that is different from said first lossless compression algorithm.

5. The encoder of claim 1 wherein said reference storage sub-system comprises a decoder that recovers pixels from said stored compressed reference frame for use by said second compression sub-system, without decoding all of said compressed reference frame at once.

6. The encoder of claim 5 wherein said reference frame is divided into a plurality of blocks of pixels and wherein said reference storage sub-system includes a cache memory that stores decoded pixels from a selected one of said blocks, said reference storage sub-system decoding all of said one of said blocks.

7. The encoder of claim 6 wherein said cache memory further stores a plurality of said blocks, said stored blocks being determined by said second compression sub-system and wherein said reference frame comprises N such blocks, said cache memory storing less than N blocks.

8. The encoder of claim 7 wherein said second compression sub-system separately compresses each block of a video frame in a predetermined order, and wherein said stored blocks are determined by said predetermined order.

9. A method for encoding a video stream comprising a plurality of video frames, said method comprising:
receiving said video stream in an encoding device;
compressing a plurality of said video frames to generate a corresponding plurality of compressed reference frames using a first lossy compression algorithm, each of said compressed reference frames being compressed without reference to any previously encoded video frames, said compressed reference frames being communicated to said remote device;
communicating said compressed reference frames to a device that is remote from said encoding device;
storing one of said compressed reference frames in a compressed format, said one of said compressed reference frames being compressed using a second lossy compression algorithm;
encoding a second plurality of said plurality of video frames using said one of said compressed reference frames as a reference for compressing each of said second plurality of said plurality of video frames to generate a plurality of compressed video frames; and
communicating said compressed video frames to said remove device,
wherein said second lossy compression algorithm is said first lossy compression algorithm.

10. The method of claim 9 wherein said first lossy compression algorithm includes a first lossless compression algorithm that compresses the output of said first lossy compression algorithm to generate said compressed reference frame that is communicated to said remote device.

11. The method of claim 10 wherein said stored compressed reference frame contains a copy of a compressed reference frame that was compressed using said first lossless algorithm.

12. The method of claim 9 wherein encoding said second plurality of said frames comprises partially decoding said stored compressed reference frame to recover pixels from said stored compressed reference frame.

13. The method of claim 12 wherein said reference frame is divided into a plurality of blocks of pixels and partially decoding said stored compressed reference frame comprising storing pixels from a selected one of said blocks in a cache memory.

14. The method of claim 13 wherein said cache memory further stores a plurality of said blocks, said stored blocks being determined by a block in a video frame that is being encoded using said compressed reference frame.

15. The method of claim 14 wherein said each block of a video frame that is encoded using said stored compressed reference frame is encoded in a predetermined order, and wherein said stored blocks are determined by said predetermined order.

\* \* \* \* \*